Figure 1:
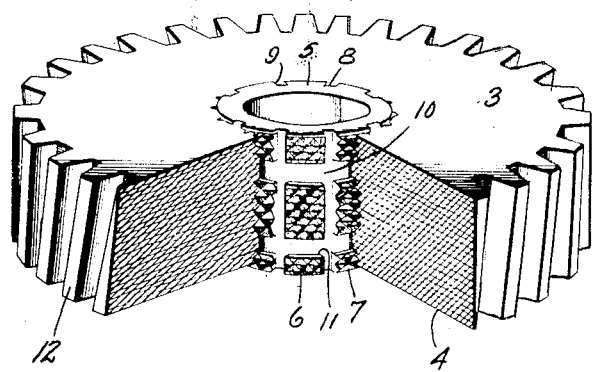

Jan. 3, 1928.

C. W. MANSUR 1,655,278

NONMETALLIC GEAR

Filed June 14, 1926

Inventor:
Clarence W. Mansur,
by
His Attorney.

Patented Jan. 3, 1928.

1,655,278

UNITED STATES PATENT OFFICE.

CLARENCE W. MANSUR, OF MALDEN, MASSACHUSETTS, ASSIGNOR TO GENERAL ELECTRIC COMPANY, A CORPORATION OF NEW YORK.

NONMETALLIC GEAR.

Application filed June 14, 1926. Serial No. 115,754.

The present invention relates to nonmetallic gears of the type comprising spinnable textile fibers which are held under compression by a suitable binder, and specifically to the means for uniting a metal hub with said fibers.

It has been the practice heretofore to knurl the peripheral surface of the hub and to depend upon the small projections and indentations thus formed to unite the metal and textile fiber parts. In such a construction the heavy pressure to which the fibers and binder are subjected causes a certain percentage of the innermost fibers and binder to enter the depressions. Such a bonding or uniting of the parts is generally satisfactory where the textile fiber portion is of considerable diameter and has a considerable amount of elasticity, but is unsatisfactory where the fiber portion is relatively small, has little elasticity and is subjected to heavy axial thrusts as is the case when such gears are mounted on the crank shaft (as distinguished from being used as intermediate gears) in an automobile timing train and have teeth cut on a spiral. In some cases these gears have spiral teeth of 45° angle and under these conditions the axial thrust on the gear is very great which thrust tends to force the textile fibers or outer portion axially off of the hub. In addition there are of course heavy strains tending to twist the outer portion about the hub as a center. As the requirements of a crank shaft gear are more severe than with any other of which I have knowledge, my invention will be described in connection therewith, but my improved construction is also useful in connection with other gears as will be appreciated.

A crank shaft gear is of necessity relatively small in diameter, and due to the fact that only a comparatively small amount of textile fibers can be used, the gear as a whole has very little elasticity either axially or circumferentially. In this connection, it should be appreciated that when an automobile engine is started, or the speed thereto suddenly changed the inertia of the gear and the parts actuated thereby is opposed to such action with the result that strains of great magnitude are set up not only circumferentially but axially as well, the latter being due to the spiral teeth on the gear.

Furthermore, the whipping effect of the crank shaft at such times gives rise to abnormal strains. The whipping is due primarily to the twisting of the crank shaft under variations in load, the fly wheel being located at one end of the shaft and the gear at the other and usually the outer end. The irregular firing of the cylinders is also a cause of shaft whipping and abnormal strains. As a result of the various causes mentioned there is a great tendency for the outer portion of the gear to be torn loose from the inner or hub portion, and it is the object of my present invention to provide an improved construction to obviate this difficulty.

For a conisderation of what I believe to be novel and my invention, attention is directed to the accompanying description and the claims appended thereto.

Figure 2:
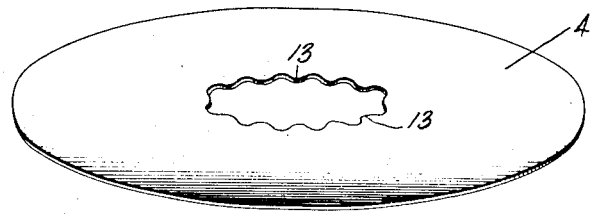

In the accompanying drawing, Fig. 1 is a perspective view on an enlarged scale of a crank shaft gear having spiral or helical teeth, and Fig. 2 is a perspective view of one of the textile fibre disks used in its construction.

3 indicates the body of the gear which comprises spinnable textile fibers and a binder to hold the fibers in a compressed state. The fibers may be arranged in a number of different ways. As shown, they are woven into fabric from which disks 4 are cut. The sheets from which the disks are cut are first treated with a suitable binder and are then subjected to further treatment to remove the solvent in the binder. Disks made from the treated material, as distinguished from untreated, are easier to make and to handle and are therefore preferable.

Referring now to the hub 5, which is of metal, usually steel, it is made in the form of a cylinder and has a roughened peripheral surface. This roughening can easily be done in a variety of ways as by a knurling or other tool and for simplicity of description the surface will hereinafter be referred to as a knurled surface without limitation, however, to the exact form illustrated. In the structure shown the result of the knurling is to form a large number of projections 6, each of which is diamond-shaped at the base and rises therefrom to a sharp point, there being small depressions, or pockets 7 between. In addition to this, the hub is provided with a plurality of axially-extending grooves 8 of which eight are shown. The walls of each groove are parallel and at right angles to the bottom wall, thereby forming definite and clear-cut shoulders 9. These shoulders and the knurling resist the tendency of the parts of the gear to turn or twist one on the other. In addition, the outer surface of the hub is provided with annular grooves 10 of which two are shown in the present illustration. They also have parallel side walls and a flat bottom wall thereby defining definite and clear-cut shoulders 11. The grooves intersect or open into the axial grooves and thus afford spaces of considerable size for the fibers. The annular grooves and the knurling resist the tendency of the outer and inner portions to move axially one on the other when the spiral teeth 12 exert a heavy thrust in an axial direction.

Referring again to the disks, these are made slightly larger in outside diameter than the completed gear to allow for finishing. In the center of each disk is a hole, and instead of making the defining wall smooth it has a number of relatively shallow flutes or corrugations to provide a plurality of projections. As a manufacturing proposition on a commercial scale it is impractical to have these disks assembled on the hub in such manner that each projection will enter an axial groove in the hub and for that reason a greater number of projections is provided than there are axial grooves, twelve being shown. This means in assembling by the ordinary methods and workmen available for the purpose that some of the projections will register with the axial grooves and others will partly register and that the average will be high.

The distance between any two points, flutes or corrugations 13 of each disk, measured in a diametrical line, is slightly less than the diameter of the bottom wall of the annular grooves 10. This means that each disk must be forced by a light pressure on to the hub. The points 13 will in the assembling operation be bent or deflected somewhat particularly in the knurled region of the hub between and also above and below the grooves. After the necessary number of disks has been assembled on the hub to make a gear of the desired face, the parts are put in a suitable mold or fixture and there subjected to heat and heavy pressure. The heat causes the binder to soften and later to harden and the pressure forces the fibers to fill both the axial and annular grooves and also the depressions in the knurling and at the same time compresses all the fibers to the desired degree to make a suitable gear. The binder is also present in limited amount in the grooves and depressions and serves to hold the fibers therein in their highly compressed state. The more completely the grooves and depressions are filled with fibers the better will be their anchorage. An examination of a section of a gear blank made in accordance with my invention shows that while the two sides thereof are parallel and perpendicular to the axis a number of the intermediate sheets are not so precisely located. This is apparently brought about by a slight movement of the fibers under the heavy pressure to which they are subjected. In any event, the intersecting grooves and depressions are completely filled with binder treated fibers and there is no evidence of any pockets or spots containing an excess of binder. This absence of pockets or spots is important because where they occur the bond or union between the metal and textile fibers is weakened in proportion to their size or area, it being remembered that it is the fibers which impart strength to the gear and not the binder which is usually of a rather brittle nature when in its hardened condition.

Owing to the fact that the axial and annular grooves in the hub intersect, the fibers located therein serve to mutually support each other, and since in the gear illustrated as an example of my invention there are sixteen such intersections, it is apparent that a very firm anchorage of one part on the other is obtained. Considering for the moment the bore of the body of the gear, the fibers which enter the grooves form a number of cross-keys, which because of their form are well adapted to resist strains to which the body is subjected.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. A gear comprising a body of spinnable textile fibers with a binder for holding the fibers in a compressed state and a metallic hub which has a roughened peripheral surface and a plurality of axially-extending shoulders and grooves into which the binder-treated fibers extend and are anchored, said body comprising a plurality of disks having central openings through which the hub passes, the defining walls of the openings being fluted to provide projections which carry the fibers into the grooves, and the projections being greater in number than the grooves.

2. A gear comprising a body of spinnable textile fibers with a binder for holding the fibers in a compressed state and a metallic hub which has axially extending shoulders and grooves, and also annular shoulders and grooves into all of which grooves the binder-treated fibers extend and are anchored, said body comprising a plurality of disks having central openings through which the hub passes, the defining walls of the openings being fluted to provide projections which carry the fibers into the grooves, the projections being greater in number than the axial grooves.

3. A gear comprising a plurality of disks each composed of spinnable textile fibers with a binder material between them, said disks having central openings, the defining walls of which have projections and a metallic hub which is provided with axially-extending grooves into which fibers of said projections extend.

4. A gear comprising a plurality of disks each composed of spinnable textile fibers with a binding material between them, said disks having central openings with defining walls having projections and a metallic hub which is provided with axial and annular grooves into which the fibers of said projections extend.

5. A gear comprising a metallic hub which has axial and annular grooves and a surrounding body portion comprising disks of spinnable textile fibers and a binder to hold them in compression, each disk having a central opening, the wall of which is fluted, the distance between the points of any two flutes measured in a diametrical line being slightly less than the diameter of the bottom walls of said annular grooves.

6. A gear comprising a metallic hub which has a knurled peripheral surface with axial and annular grooves which cut the knurling and extend below the surface thereof, and a surrounding body comprising disks of spinnable textile fibers and a binder to hold them in a compressed state, each disk having a central opening with a fluted defining wall, the projections of said flutes entering the said grooves and also the depressions in the knurling.

7. A gear comprising a metallic hub which has a knurled peripheral surface and also intersecting grooves and shoulders, a body comprising woven textile fiber disks which surrounds the hub with a large number of their fibers located in said intersecting grooves and in the depressions in the knurled surface, said fibers interlocking with the shoulders to form cross-keys, and a binder which unites and holds all of said fibers in a compressed state, each disk having a central opening through which the hub passes, the defining wall of each opening being fluted to provide projections which carry the fibers into said grooves.

In witness whereof, I have hereunto set my hand this 11th day of June 1926.

CLARENCE W. MANSUR.